US011512010B2

(12) United States Patent
Acre et al.

(10) Patent No.: US 11,512,010 B2
(45) Date of Patent: Nov. 29, 2022

(54) WATER GENERATION SYSTEM FOR A VEHICLE THAT IMPLEMENTS SANITIZATION BY ULTRAVIOLET LIGHT

(71) Applicant: Ford Global Technologies, LLC, Dearborn, MI (US)

(72) Inventors: James Alan Acre, Monroe, MI (US); Robert D. Bedard, Allen Park, MI (US); John P. Casci, Westland, MI (US); James George Gebbie, Rochester Hills, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 17/108,647

(22) Filed: Dec. 1, 2020

(65) Prior Publication Data

US 2022/0169538 A1 Jun. 2, 2022

(51) Int. Cl.
*C02F 1/32* (2006.01)
*C02F 1/00* (2006.01)
*C02F 103/18* (2006.01)

(52) U.S. Cl.
CPC ............... *C02F 1/32* (2013.01); *C02F 1/002* (2013.01); *C02F 2103/18* (2013.01); *C02F 2307/10* (2013.01)

(58) Field of Classification Search
CPC ........ C02F 1/32; C02F 1/002; C02F 2103/18; C02F 2307/10
See application file for complete search history.

(56) References Cited

U.S. PATENT DOCUMENTS

| 5,435,151 | A  | 7/1995  | Han           |
| 6,182,453 | B1 | 2/2001  | Forsberg      |
| 6,481,232 | B2 | 11/2002 | Faqih         |
| 6,684,648 | B2 | 2/2004  | Faqih         |
| 6,755,037 | B2 | 6/2004  | Engel et al.  |
| 6,962,381 | B2 | 11/2005 | Warning       |

(Continued)

FOREIGN PATENT DOCUMENTS

| CN | 102698495 A | 10/2012 |
| CN | 102701474 A | 10/2012 |

(Continued)

*Primary Examiner* — Waqaas Ali
(74) *Attorney, Agent, or Firm* — Vichit Chea; Price Heneveld LLP

(57) ABSTRACT

A water generation system for a vehicle comprises: a first container to collect liquid water generated from the condensation of water vapor; a filter to filter the liquid water, the filter in fluid flow communication with the first container; a second container to store the liquid water that the filter filtered, the second container (i) in fluid flow communication with the filter and (ii) configured to hold a larger volume of the liquid water than the first container; and a source of ultraviolet light that, when activated, emits the ultraviolet light into at least one of the first container and the second container. The water generation system can further comprise an agitator that is configured to agitate the liquid water disposed within either the first container or the second container, and a cooling element configured to withdraw heat from the liquid water within the water generation system.

20 Claims, 4 Drawing Sheets

(56) References Cited

U.S. PATENT DOCUMENTS

| | | |
|---|---|---|
| 8,252,174 B2 | 8/2012 | Jones et al. |
| 8,742,364 B2 | 6/2014 | Boodaghians et al. |
| 2010/0025311 A1 | 2/2010 | Jones et al. |
| 2012/0221198 A1 | 8/2012 | Kohavi et al. |
| 2013/0199221 A1* | 8/2013 | Tudor ............. F25D 21/14 62/93 |
| 2016/0083936 A1 | 3/2016 | Martin et al. |
| 2019/0056751 A1 | 2/2019 | Ferguson et al. |

FOREIGN PATENT DOCUMENTS

| | | |
|---|---|---|
| CN | 205044604 U | 2/2016 |
| CN | 105595836 A | 5/2016 |
| CN | 105711468 A | 6/2016 |
| CN | 205523857 U | 8/2016 |
| CN | 109159643 A | 1/2019 |
| CN | 110588276 A | 12/2019 |
| CN | 211308340 U | 8/2020 |
| CN | 213178911 U | 5/2021 |
| WO | 2015186143 A2 | 12/2015 |
| WO | WO-2020105247 A1 * | 5/2020 |

* cited by examiner

WATER GENERATION SYSTEM FOR A VEHICLE THAT IMPLEMENTS SANITIZATION BY ULTRAVIOLET LIGHT

FIELD OF THE DISCLOSURE

The present disclosure generally relates to a vehicle that generates liquid water for consumption by an occupant.

BACKGROUND OF THE DISCLOSURE

A vehicle can generate water that is intended for consumption by an occupant. However, there is a problem in that the water generated can contain microbes that would otherwise be dispensed with the water to the occupant.

SUMMARY OF THE DISCLOSURE

The present disclosure addresses that problem by sanitizing the liquid water that was generated with ultraviolet light. One or more sources of ultraviolet light are disposed to emit the ultraviolet light into the container(s) in which the liquid water is stored before being dispensed to the occupant. Agitators agitate the liquid water. A dedicated battery powers the source(s) of ultraviolet light so that the source(s) can periodically emit the ultraviolet light to maintain the liquid water is a relatively constant state of sanitization.

According to a first aspect of the present disclosure, a water generation system for a vehicle comprises: a first container to collect liquid water generated from condensation of water vapor; a filter to filter the liquid water, the filter in fluid flow communication with the first container; a second container to store the liquid water that the filter filtered, the second container (i) in fluid flow communication with the filter and (ii) configured to hold a larger volume of the liquid water than the first container; and a source of ultraviolet light that, when activated, emits the ultraviolet light into at least one of the first container and the second container.

Embodiments of the first aspect of the present disclosure can include any one or a combination of the following features:
 the water generation system further comprises an agitator that is configured to agitate the liquid water disposed within either the first container or the second container;
 the agitator comprises a magnetizable element within either of the first container or the second container that rotates in response to a rotating magnetic field generated outside of the first container or the second container;
 the water generation system further comprises a cooling element configured to withdraw heat from the liquid water within the water generation system;
 the water generation system further comprises a pump that, when activated, transports the liquid water from the second container, through the cooling element, and back to the second container;
 the water generation system further comprises a controller in communication with the pump, the controller configured to activate the pump until a temperature of the liquid water in the second container has decreased to a predetermined temperature;
 the controller is in communication with the source of the ultraviolet light, and the controller is configured to cause the source to emit the ultraviolet light for a predetermined period of time and at reoccurring intervals;
 the water generation system further comprises a battery providing electrical power to the source of the ultraviolet light, including when the vehicle is deactivated;
 the water generation system further comprises a purge valve in fluid flow communication with the second container;
 the controller is in communication with the purge valve, and the controller is configured to manipulate the purge valve as a function of either (i) a temperature of the liquid water within the second container, (ii) a period of time that the second container has held the liquid water, or (iii) both (i) and (ii);
 the water generation system further comprises an evaporator that condenses the water vapor into the liquid water;
 the source of the ultraviolet light that, when activated, emits the ultraviolet light onto both the liquid water within the second container and an inner surface of the second container that contacts the liquid water; and
 the source of the ultraviolet light that, when activated, emits the ultraviolet light onto both the liquid water within the first container and an inner surface of the first container that contacts the liquid water.

According to a second aspect of the present disclosure, a vehicle comprises: an evaporator configured to condense water vapor into liquid water; a first container configured to collect the liquid water that condensed; a source of ultraviolet light that, when activated, emits the ultraviolet light into the liquid water within the first container and onto an inner surface of the first container that contacts the liquid water; a filter to filter the liquid water, the filter in fluid flow communication with the first container; a second container to store the liquid water that the filter filtered in fluid flow communication with the filter, the second container configured to hold a larger volume of the liquid water than the first container; a second source of ultraviolet light that, when activated, emits the ultraviolet light onto the liquid water with the second container and onto an inner surface of the second container that contacts the liquid water; an agitator configured to agitate the water in the second container; and a controller in communication with the agitator and the second source of the ultraviolet light, the controller configured to activate the agitator and the second source of the ultraviolet light at preset intervals.

Embodiments of the second aspect of the present disclosure can include the following feature:
 the controller is configured to activate simultaneously the agitator and the second source of the ultraviolet light at the preset intervals.

According to a third aspect of the present disclosure, a method of sanitizing liquid water that a vehicle has generated comprises: after water vapor has been condensed into liquid water, emitting ultraviolet light into the liquid water; transporting the liquid water to a container, after emitting the ultraviolet light into the liquid water, to store the liquid water; and again emitting ultraviolet light into the liquid water while the liquid water is within the container.

Embodiments of a third aspect of the present disclosure can include any one or a combination of the following features:
 the method further comprises determining that the liquid water in the container should be purged as a function of a temperature of the liquid water in the container and a period of time that the container has held the liquid water;
 the method further comprises purging the liquid water from the container;

the method further comprises, before transporting the liquid water to the container, filtering the liquid water;

the method further comprises extracting heat from the liquid water, after transporting the liquid water to the container;

the method further comprises agitating the liquid water while the liquid water is within the container; and the method further comprises condensing the water vapor into the liquid water.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

Figure 1:
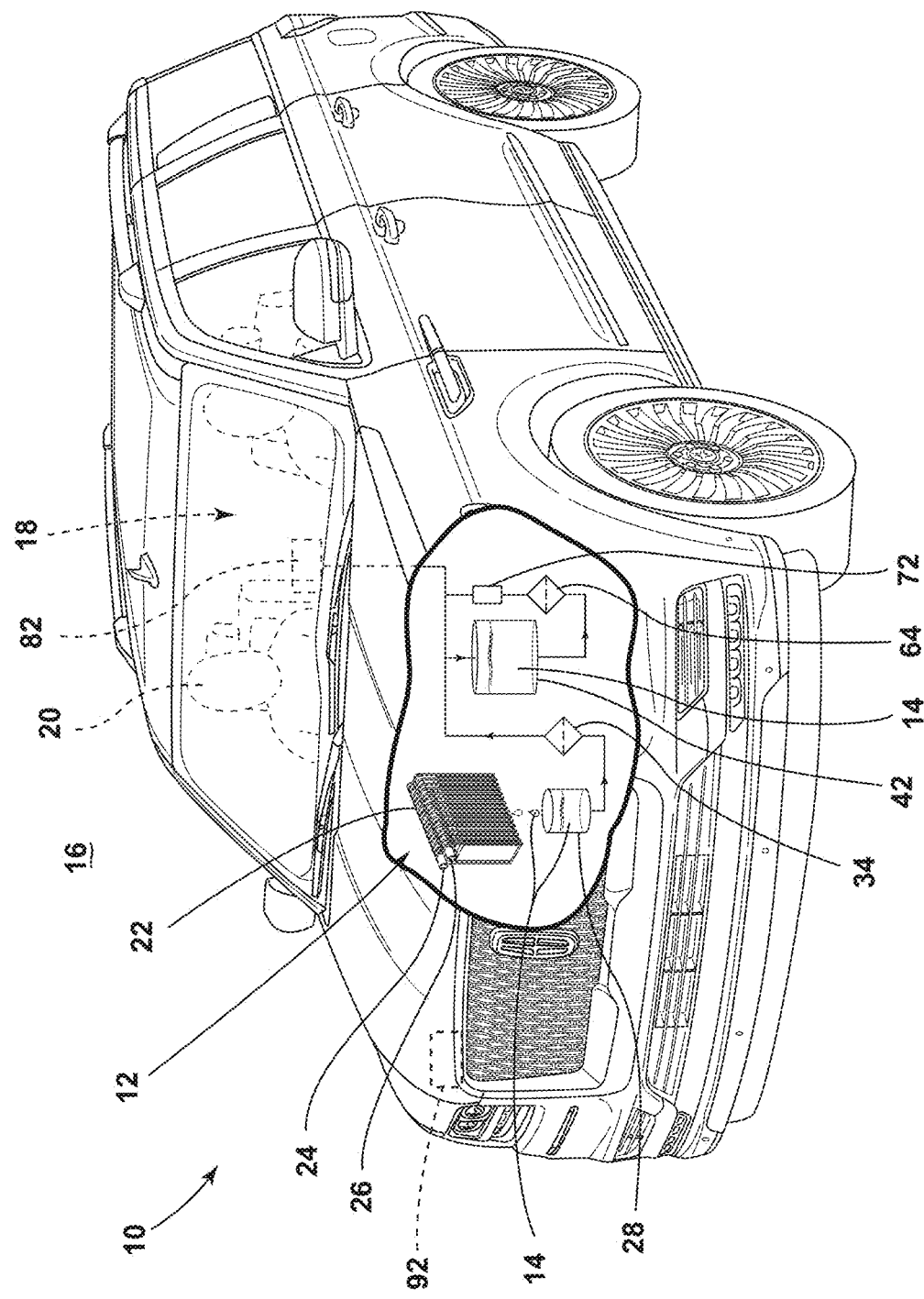
FIG. 1 is a perspective view of a vehicle, illustrating a water generation system that generates liquid water for dispensing to an occupant within the interior of the vehicle and a controller that controls various components of the water generation system.
Figure 2:
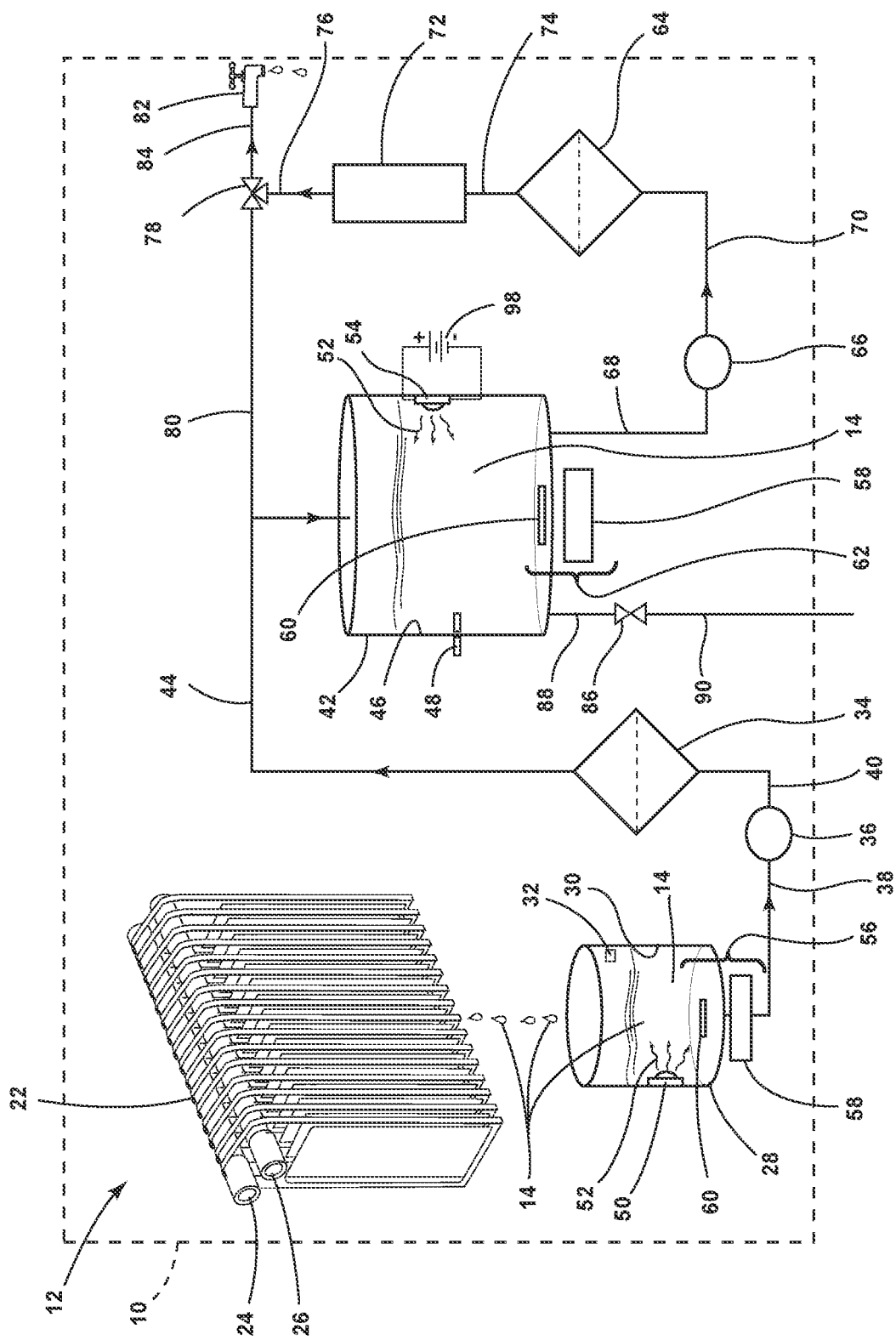
FIG. 2 is a schematic view of the water generation system of FIG. 1, illustrating the liquid water flowing from an evaporator on which the liquid water condensed to a first container, and flowing from the first container to a second container that, in the illustrated embodiment, is larger than the first container for storage before being dispensed, and separate sources of ultraviolet light to sanitize the liquid water in both the first container and the second container.

Referring now to FIGS. 1 and 2, a vehicle 10 includes a water generation system 12. The water generation system 12 condenses water vapor from air into liquid water 14. The air can be from an environment 16 external to the vehicle 10 or air from an interior 18 of the vehicle 10. As will be discussed, the water generation system 12 sanitizes and filters the liquid water 14. The liquid water 14 can then be dispensed to an occupant 20 within the interior 18 of the vehicle 10. The occupant 20 can then drink the liquid water 14. The occupant 20 can operate the vehicle 10, or the vehicle 10 can operate semi-autonomously or fully autonomously. The vehicle 10 can be a car, truck, van, sports utility vehicle, an airplane, train passenger car, and any other thing that transports an occupant 20.

In embodiments, the water generation system 12 includes an evaporator 22. The evaporator 22 includes an inlet 24 and an outlet 26 for refrigerant (not illustrated). In embodiments, a compressor (not illustrated) pressurizes the refrigerant exiting the outlet 26 of the evaporator 22. A condenser (not illustrated) extracts heat from the refrigerant, which lowers a temperature of the refrigerant and condenses the refrigerant. The refrigerant is passed through a valve (not illustrated) where the refrigerant expands and the temperature decreases. The refrigerant is then supplied back to the evaporator 22 through the inlet 24.

Air from the interior 18 or the environment 16 (or both) is passed over the evaporator 22. The evaporator 22, with the refrigerant, extracts heat from the air (thus reducing a temperature of the air) and water vapor in the air condenses upon the evaporator 22 as the liquid water 14. The air, with its enthalpy temperature reduced, is either directed to the interior 18 or expelled to the environment 16. The refrigerant in the evaporator 22 increases in enthalpy and is passed out the outlet 26, as described above.

The water generation system 12 further includes a first container 28. The liquid water 14 that condenses upon the evaporator 22 flows into the first container 28. In embodiments, the liquid water 14 collects upon the evaporator 22 and gravity causes drops of the liquid water 14 to fall into the first container 28. In any event, the first container 28 collects the liquid water 14 generated from the condensation of the water vapor in the air upon the evaporator 22. Stated another way, the first container 28 collects the liquid water 14 that condensed from the water vapor in the air. The first container 28 includes an inner surface 30 that contacts the liquid water 14. In embodiments, the water generation system 12 includes a sensor 32 cooperating with the first container 28. The sensor 32 produces an output that changes as a function of the volume of the liquid water 14 within the first container 28.

The water generation system 12 further includes a filter 34. The filter 34 is in fluid flow communication with the first container 28. The water generation system 12 can further include a pump 36 to effectuate desired flow from the first container 28 to and through the filter 34. In embodiments, the water generation system 12 further includes tubing 38 between the first container 28 and the pump 36, and tubing 40 between the pump 36 and the filter 34. The liquid water 14 flows through the tubing 38 from the first container 28 to the pump 36, and then through the tubing 40 from the pump 36 and to the filter 34. The filter 34 filters the liquid water 14. In embodiments, the filter 34 filters sediment, minerals, and microbes from the liquid water 14. The filter 34 can be a module of several filters in fluid flow sequence to filter sequentially smaller particles from the liquid water 14.

The water generation system 12 further includes a second container 42. In embodiments, the second container 42 is configured to hold a larger volume of the liquid water 14 than the first container 28. For example, the second container 42 can have a capacity to hold a volume of liquid water 14 that is two to ten times greater than a capacity of the first container 28. However, in other embodiments, the first container 28 is configured to hold a larger volume of the liquid water 14 than the second container 42. In embodiments, the first container 28 initially collects the liquid water 14. The liquid water 14 is then transported from the first container 28 to the second container 42 to store the liquid water 14 before the liquid water 14 is ultimately dispensed to the occupant 20. In embodiments, the second container 42 has a volume of 2 liters to 4 liters.

The second container 42 is in fluid flow communication with the filter 34. For example, in embodiments, the water generation system 12 further includes tubing 44 between the filter 34 and the second container 42. The liquid water 14 flows from the filter 34 through the tubing 44 and into the second container 42. The pump 36 further forces the liquid water 14 to flow through the filter 34 and then through the tubing 44 into the second container 42. The second container 42 stores the liquid water 14 that the filter 34 filtered, before the liquid water 14 is ultimately dispensed to the occupant 20. The second container 42 has an inner surface 46 that contacts the liquid water 14. In embodiments, the water generation system 12 further includes a sensor 48, and the sensor 48 produces an output that varies as a function of the temperature of the liquid water 14 in the second container 42.

The water generation system 12 includes a source 50 of ultraviolet light 52. The source 50 of the ultraviolet light 52, when activated, emits the ultraviolet light 52 onto the liquid water 14. The source 50 emits the ultraviolet light 52 into at least one of the first container 28 and the second container 42. In the embodiments illustrated, the source is positioned to emit the ultraviolet light 52 into the first container 28, including into the liquid water 14 within the first container 28 and onto the inner surface 30 of the first container 28. However, in other embodiments, the source 50 is positioned to emit the ultraviolet light 52 into the second container 42.

In embodiments, the water generation system 12 further includes a second source 54 of ultraviolet light 52. When activated, if the source 50 of the ultraviolet light 52 emits the ultraviolet light 52 into the first container 28, then the second source 54 of the ultraviolet light 52 emits the ultraviolet light 52 into the second container 42. However, if the source 50 of the ultraviolet light 52 emits the ultraviolet light 52 into the second container 42, then the second source 54 of the ultraviolet light 52 emits the ultraviolet light 52 into the first container 28. In the embodiments illustrated, the second source 54 is positioned to emit the ultraviolet light 52 into the second container 42, including into the liquid water 14 within the second container 42 and onto the inner surface 46 of the second container 42. However, in other embodiments, the second source 54 is positioned to emit the ultraviolet light 52 into the first container 28.

The ultraviolet light 52 sanitizes the liquid water 14 before the liquid water 14 is ultimately dispensed to the occupant 20. "Ultraviolet light" herein means electromagnetic radiation having a wavelength of 10 nm to 400 nm. In embodiments, the wavelength of the ultraviolet light 52 is 100 nm to 300 nm, or 220 nm to 300 nm. In embodiments, the source 50 of the ultraviolet light 52 is one or more light emitting diodes, as is the second source 54 if included. In other embodiments, the source 50 of the ultraviolet light 52 is one or more mercury vapor lamps, as is the second source 54 if included. The ultraviolet light 52 sanitizes the liquid water 14 by destroying microbes within the liquid water 14 or hindering the ability of the microbes to reproduce or replicate. Microbes includes bacteria, viruses, fungi, and the like.

In addition, when the source 50 of the ultraviolet light 52 is positioned to emit the ultraviolet light 52 into the first container 28, the ultraviolet light 52 sanitizes the inner surface 30 of the first container 28. Sanitizing the inner surface 30 of the first container 28 prevents the inner surface 30 from harboring microbes that can be transferred into the liquid water 14 fed into the first container 28. In addition, the sanitization prevents biofilms from forming on the inner surface 30.

Likewise, when the second source 54 of the ultraviolet light 52 is positioned to emit the ultraviolet light 52 into the second container 42, the ultraviolet light 52 sanitizes the inner surface 46 of the second container 42. Sanitizing the inner surface 46 of the second container 42 prevents the inner surface 46 from harboring microbes that can be transferred into the liquid water 14 fed into the second container 42. In addition, the sanitization prevents biofilms from forming on the inner surface 46.

In embodiments, the water generation system 12 further includes an agitator 56. The agitator 56 is configured to agitate the liquid water 14 disposed within either the first container 28 or the second container 42. In the embodiments illustrated, the agitator 56 is configured to agitate the liquid water 14 disposed in the first container 28. In other embodiments, the agitator 56 is configured to agitate the liquid water 14 disposed in the second container 42. In the illustrated embodiments, the agitator 56 is positioned to agitate the liquid water 14 within the first container 28.

In embodiments, the agitator 56 includes a magnetic stirrer device 58 that, when activating, produces a rotating magnetic field. The magnetic stirrer device 58 is disposed outside of whichever of the first container 28 or the second container 42 the agitator 56 is positioned to agitate the liquid water 14 within. The agitator 56 further includes a magnetizable element 60 disposed inside whichever of the first container 28 or the second container 42 the agitator 56 is positioned to agitate the liquid water 14 within. The magnetizable element 60 can have a bar shape. The magnetizable element 60 can be referred to as a stir bar. The magnetizable element 60 rotates in response to the rotating magnetic field that the magnetic stirrer device 58 generates. Because the magnetizable element 60 is disposed within the first container 28 or the second container 42, as the case may be, the magnetizable element 60 rotates within the liquid water 14. The rotation of the magnetizable element 60 within the liquid water 14 agitates the liquid water 14. The agitation of the liquid water 14 may improve the ability of the ultraviolet light 52 to sanitize the liquid water 14. In addition, agitation of the liquid water 14 helps prevent material from settling within the liquid water 14. Material settling within the liquid water 14 can reduce the ability of the liquid water 14 to transport the material to the filter 34 for filtering. The use of the magnetizable element 60 and the magnetic stirrer device 58 is advantageous because no holes need to be made through the first container 28 (or the second container 42) for the insertion of a shaft connected to a motor.

In embodiments, the water generation system 12 further includes a second agitator 62. If the agitator 56 is configured to agitate the liquid water 14 in the first container 28, then the second agitator 62 is configured to agitate the liquid water 14 in the second container 42. However, if the agitator 56 is configured to agitate the liquid water 14 in the second container 28, then the second agitator 62 is configured to agitate the liquid water 14 in the first container 28. In the embodiments illustrated, the second agitator 62 is configured to agitate the liquid water 14 disposed in the second container 42. In other embodiments, the second agitator 62 is configured to agitate the liquid water 14 disposed in the first container 28. In embodiments, the second agitator 62, like the agitator 56, includes a magnetic stirrer device 58 and a magnetizable element 60 that functions in the same matter as the magnetic stirrer device 58 and the magnetizable element 60 associated with the agitator 56.

In embodiments, the water generation system 12 further includes a second filter 64. The second filter 64 filters the liquid water 14 within the second container 42. In embodiments, the water generation system 12 further includes a second pump 66. The second pump 66, when activated, transports the liquid water 14 from the second container 42 and to and through the second filter 64. In embodiments, tubing 68 connects the second container 42 to the second pump 66, and tubing 70 connects the second pump 66 to the second filter 64. Accordingly, the second pump 66 causes the liquid water 14 to flow from the second container 42, through tubing 68, through the second pump 66, through the tubing 70, and through the second filter 64.

In embodiments, the water generation system 12 further includes a cooling element 72. The cooling element 72 is configured to withdraw heat from the liquid water 14 within the water generation system 12, specifically the liquid water 14 within the second container 42, and, thereby, lower a temperature of the liquid water 14. The cooling element 72 can be a thermoelectric device, a heat exchanger that utilizes refrigerant, among other options. In embodiments, the cooling element 72 is in fluid communication with the second container 42. In embodiments, the water generation system 12 includes tubing 74 for the liquid water 14 in the second container 42 to flow from the second filter 64 to the cooling element 72, tubing 76 for the liquid water 14 to flow from the cooling element 72 to a three-way valve 78, and tubing 80 for the liquid water to flow from the three-way valve 78 back to the second container 42. When the second pump 66 is activated and the three-way valve 78 is manipulated accordingly, the liquid water 14 flows from the second container 42, through the tubing 68, through the second pump 66, through the tubing 70, through the cooling element 72, through the tubing 76, through the three-way valve 78, through the tubing 80, and back into the second container 42. The liquid water 14 within the second container 42 is thus filtered and the temperature of the liquid water 14 is reduced.

In embodiments, the water generation system 12 further includes a dispenser 82. The dispenser 82 dispenses the liquid water 14 to the occupant 20 within the interior 18. Tubing 84 connects the dispenser 82 to the three-way valve 78. When the second pump 66 is activated and the three-way valve 78 is manipulated accordingly, after exiting the cooling element 72, the liquid water 14 flows through the tubing 76, through the three-way valve 78, through the tubing 84, and out the dispenser 82.

In embodiments, the water generation system 12 further includes a purge valve 86. The purge valve 86 is in fluid flow communication with the second container 42. For example, in embodiments, the water generation system 12 further includes tubing 88 from the second container 42 to the purge valve 86 and tubing 90 from the purge valve 86 to the environment 16 external of the vehicle 10. When the purge valve 86 is in an opened state, the liquid water 14 flows from the second container 42 to the environment 16 external to the vehicle 10. For example, the liquid water 14 can flow from the second container 42, through the tubing 88, through the purge valve 86, and through the tubing 90 to the environment 16.

Figure 3:
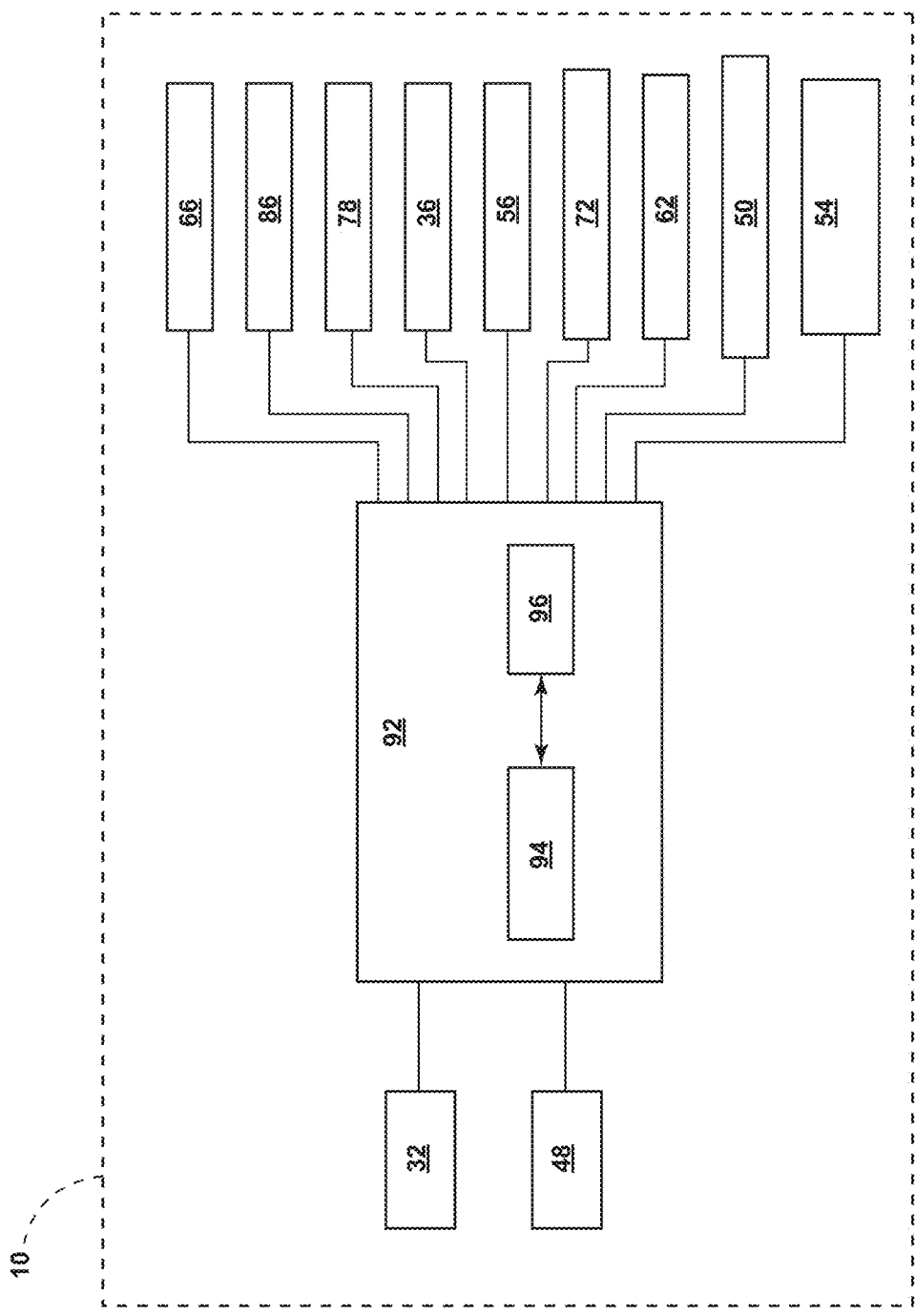
FIG. 3 is a schematic diagram of the controller of the water generation system of FIG. 1, illustrating the controller controlling the sources of the ultraviolet light, as well as agitators to agitate the liquid water in both the first container and the second container and a pump to transport the liquid water, as a function of several sensors.

Referring now additionally to FIG. 3, in embodiments, the water generation system 12 further comprises a controller 92. The controller 92 is in communication with and controls activation and deactivation of the pump 36, the second pump 66, the agitator 56, the second agitator 62, the source 50 of the ultraviolet light 52, the second source 54 of the ultraviolet light 52, the three-way valve 78, the purge valve 86, and the cooling element 72. In addition, the controller 92 is in communication with and receives signals from the sensor 32 and the sensor 48. The controller 92 includes a processor 94 and memory 96. The memory 96 can store programs to effectuate activation and deactivation of the pump 36, the second pump 66, the agitator 56, the second agitator 62, the source 50 of the ultraviolet light 52, the second source 54 of the ultraviolet light 52, the three-way valve 78, the purge valve 86, and the cooling element 72, based on data received from the sensor 32, sensor 48, and timer functions of the controller 92. The processor 94 executes the programs. The processor 94 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 96 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid-state drives, etc.). In some examples, the memory 96 includes multiple kinds of memory, particularly volatile memory and non-volatile memory.

As mentioned, the controller 92 is in communication with the sensor 32 associated with the first container 28. When the controller 92 receives data from the sensor 32 that indicates that a volume of liquid water 14 within the first container 28 is greater than a predetermined volume, then the controller 92 activates the pump 36. As discussed, activation of the pump 36 causes the liquid water 14 in the first container 28 to transport through the filter 34 and into the second container 42.

As mentioned, the controller 92 is additionally in communication with the source 50 of the ultraviolet light 52. In embodiments, the controller 92 activates the source 50 of the ultraviolet light 52 to cause the source 50 to emit the ultraviolet light 52 into the first container 28 for a predetermined period of time and at reoccurring intervals. For example, the predetermined period of time can be 10 seconds, 30 seconds, 1 minute, 5 minutes, 30 minutes, 1 hour, 2 hours, 5 hours, 10 hours, or within a range between any two of those values (e.g., 10 seconds to 4 minutes, 30 seconds to 2 hours, and so on). The reoccurring interval can be every 5 minutes, 10 minutes, 15 minutes, 30 minutes, 1 hour, 2 hours, 5 hours, 10 hours, 24 hours, 36 hours, 48 hours, or within a range between any two of those values (e.g., 1 hour to 10 hours). Thus, as an example, the controller 92 activates the source of the ultraviolet light 52 to cause the source 50 to emit the ultraviolet light 52 for 5 minutes every 1 hour. As another example, the controller 92 activates the source 50 of the ultraviolet light 52 to cause the source 50 to emit the ultraviolet light 52 for 30 minutes every 24 hours. The ultraviolet light 52 destroys the microbes within the liquid water 14 held within the first container 28 or hinders the ability of the microbes to replicate or reproduce.

In embodiments, the controller 92 activates the pump 36 to transport the liquid water 14 from the first container 28, through the filter 34, and into second container 42 only after causing the source 50 of the ultraviolet light 52 to emit the ultraviolet light 52 into the liquid water 14 within the first container 28. This measure ensures that the liquid water 14 does not pass through the filter 34 and enter the second container 42 without first being sanitized. Thus, this measure extends the useful life of the filter 34.

In embodiments, the controller 92 activates the agitator 56 to agitate the liquid water 14 within the first container 28. In embodiments, the controller 92 simultaneously activates both the agitator 56 and the source 50 of the ultraviolet light 52. Simultaneously agitating and emitting the ultraviolet light 52 into the liquid water 14 within the first container 28 may improve sanitization of the liquid water 14 because the agitator 56 moves microbes further away from the source 50 closer to the source 50. The closer the microbes are to the source 50, the more effective the ultraviolet light 52 is at destroying the microbes or removing the ability of the microbes to replicate. In other embodiments, the controller activates the agitator 56 separately from the source 50 of the ultraviolet light 52.

As mentioned, the controller 92 controls activation of the second pump 66. In embodiments, the controller 92 activates the second pump 66 as a function of signals received from the sensor 48. In embodiments, the controller 92 activates the second pump 66 until the temperature of the liquid water 14 in the second container 42 has decreased to a predetermined temperature. For example, upon receiving a signal from the sensor 48 that indicates that the temperature of the liquid water 14 in the second container 42 is greater than the predetermined temperature, the controller 92 activates the second pump 66 and the cooling element 72 to cause the liquid water 14 to flow from the second container 42, through the second filter 64, through the cooling element 72, and then back to the second container 42. The controller 92 additionally manipulates the three-way valve 78 to direct the liquid water 14 back to the second container 42. The cooling element 72 reduces the temperature of the liquid water 14. The controller 92 activates the second pump 66 and the cooling element 72 until the sensor 48 provides a signal to the controller 92 that indicates that the temperature of the liquid water 14 in the second container 42 is not greater than the predetermined temperature (or a certain number of degrees less than the predetermined temperature). Alternatively, the controller 92 can activate the second pump 66 for a predetermined period of time (e.g., 30 seconds).

As mentioned, the controller 92 controls activation of the second source 54 of the ultraviolet light 52. In embodiments, the controller 92 activates the second source 54 of the ultraviolet light 52 to cause the second source 54 to emit ultraviolet light 52 into the second container 42 for a predetermined period of time and at reoccurring intervals. For example, the predetermined period of time can be 10 seconds, 30 seconds, 1 minute, 5 minutes, 30 minutes, 1 hour, 2 hours, 5 hours, 10 hours, or within a range between any two of those values (e.g., 10 seconds to 4 minutes, 30 seconds to 2 hours, and so on). The reoccurring interval can be every 1 hour, 2 hours, 5 hours, 10 hours, 24 hours, 36 hours, 48 hours, or within a range between any two of those values (e.g., 1 hour to 10 hours). Thus, as an example, the controller 92 activates the second source 54 of the ultraviolet light 52 to cause the source to emit the ultraviolet light 52 for 5 minutes every 1 hour. As another example, the controller 92 activates the second source 54 of the ultraviolet light 52 to cause the source to emit the ultraviolet light 52 for 30 minutes every 24 hours. The ultraviolet light 52 destroys the microbes within the liquid water 14 held within the second container 42 or hinders the ability of the microbes to reproduce.

In embodiments, the controller 92 activates the second source 54 of the ultraviolet light 52 without activating the second pump 66. The emission of the ultraviolet light 52 maintains the liquid water 14 in a state of relative sanitization within the second container 42 without the need to power the second pump 66 to transport the liquid water 14 through the second filter 64, through the cooling element 72, and then back to the second container 42. The second source 54 of the ultraviolet light 52 requires less energy to emit the ultraviolet light 52 than the second pump 66 and thus improves energy efficiency of the water generation system 12 compared to a system that implements only the second filter 64 (and not the second source 54). In addition, incorporation of the second source 54 extends the period of time before the second filter 64 loses effectiveness so as to require replacement.

As mentioned, the controller 92 controls activation of the second agitator 62. In embodiments, the controller 92 simultaneously activates both the second agitator 62 that agitates the liquid water 14 in the second container 42 and the second source 54 of the ultraviolet light 52 that emits the ultraviolet light 52 into the second container 42. Simultaneously agitating the liquid water 14 and emitting the ultraviolet light 52 into the liquid water 14 within the second container 42 may improve sanitization of the liquid water 14 because microbes further away from the second source 54 are moved closer to the second source 54. The closer the microbes are to the second source 54, the more effective the ultraviolet light 52 is at destroying the microbes or removing the ability of the microbes to replicate.

In embodiments, the water generation system 12 further includes a battery 98. The battery 98 provides electrical power to one or both of the source 50 of the ultraviolet light 52 and the second source 54 of the ultraviolet light 52, including when the vehicle 10 is deactivated. By "deactivated," it is meant that a source of propulsion of the vehicle 10 is not receiving sufficient electrical power to move the vehicle 10. For example, if the source of propulsion of the vehicle 10 includes a combustion engine, then the combustion engine (such as an associated ignition system) is not receiving sufficient electrical power to combust fuel to move the vehicle 10. If the source of the vehicle 10 includes an electric motor, then the electric motor is not receiving sufficient electrical power to cause the electric motor to move the vehicle 10. Thus, the battery 98 allows the source 50 and the second source 54 to emit the ultraviolet light 52 independently of occupant 20 usage of the vehicle 10 and to maintain the liquid water 14 in a perpetual state of sanitization in both the first container 28 and the second container 42 without occupant 20 involvement.

In embodiments, the battery 98 can additionally provide electrical power to one or more of the controller 92, the cooling element 72, the agitator 56, the second agitator 62, the three-way valve 78, and the purge valve 86.

As mentioned, the controller 92 controls activation of the purge valve 86. In such embodiments, the controller 92 is configured to manipulate the purge valve 86 as a function of either (i) the temperature of the liquid water 14 within the second container 42, (ii) a period of time that the second container 42 has held the liquid water 14, or (iii) or both (i) and (ii). In other words, the controller 92 causes the purge valve 86 to move from a closed state to the opened state, as a function of either (i) the temperature of the liquid water 14 within the second container 42, (ii) the period of time that the second container 42 has held the liquid water 14, or (iii) or both (i) and (ii). As an example, if the controller 92 receives data from the sensor 48 that the temperature of the liquid water 14 within the second container 42 is greater than a predetermined temperature, then the controller 92 causes the purge valve 86 to change from the closed state to the opened state, allowing the liquid water 14 to drain from the second container 42 to the environment 16 external to the vehicle 10. As another example, if the controller 92 determines that the second container 42 has held the liquid water 14 for greater than a predetermined period of time, then the controller 92 causes the purge valve 86 to change from the closed state to the opened state, allowing the liquid water 14 to drain from the second container 42 to the environment 16 external to the vehicle 10. Timer functions of the controller 92 can monitor a period of time since the controller 92 has caused the purge valve 86 to move to the closed state from the opened state, or the period of time since the controller 92 caused dispensing of the liquid water 14 from the second container 42 to interior 18 of the vehicle 10, and use the shortest period of time as the time that the second container 42 has held the liquid water 14. Alternatively, the controller 92 can monitor the period of time since the controller 92 last activated the pump 36 to transport the liquid water 14 from the first container 28 to the second container 42, and use that period of time when determining whether to cause the purge valve 86 to move to an opened state.

As mentioned, in embodiments, the controller 92 causes the purge valve 86 to move to the opened state as a function of both the temperature of the liquid water 14 within the second container 42, and the period of time that the second container 42 has held the liquid water 14. For example, the controller 92 can periodically calculate a staleness score to the liquid water 14 held within the second container 42, and cause the purge valve 86 to move to the opened state when the staleness score is calculated to be greater than a predetermined value. As the temperature of the liquid water 14 in the second container 42 increases, the staleness score increases. As the temperature of the liquid water 14 in the second container 42 decreases, the staleness score decreases. As the period of time the second container 42 has held the liquid water 14 increases, the staleness score increases. As the period of time the second container 42 has held the liquid water 14 decreases, the staleness score decreases. Accordingly, at relatively high temperatures, the controller 92 may calculate the staleness score to be greater than the predetermined value for purging, and cause the purge valve 86 to move to the opened state, even if the second container 42 has held the liquid water 14 for a relatively short period of time. Similarly, after the second container 42 has held the liquid water 14 for relatively long period of time, the controller 92 may calculate the staleness score to be greater than the predetermined value for purging, regardless of the temperature of the liquid water 14, and cause the purge valve 86 to move to the opened state, even if the temperature of the liquid water 14 is relatively low.

In embodiments, the controller 92 can cause the second source 54 of the ultraviolet light 52 to emit the ultraviolet light 52 into the liquid water 14 within the second container 42 and the agitator 56 to agitate the liquid water 14 within the second container 42 when the vehicle 10 is activated from a deactivated state, that is, when the propulsion system of the vehicle 10 receives sufficient electrical power to move the vehicle 10. The controller 92 can further cause the second pump 66 simultaneously to transport the liquid water 14 through the cooling element 72. These measures place the liquid water 14 in condition to be dispensed, that is, sanitized and cooled.

As mentioned, the controller 92 manipulates the three-way valve 78. In embodiments, the controller 92 manipulates the three-way valve 78 to direct the liquid water 14, cooled by the cooling element 72, to the dispenser 82.

Figure 4:
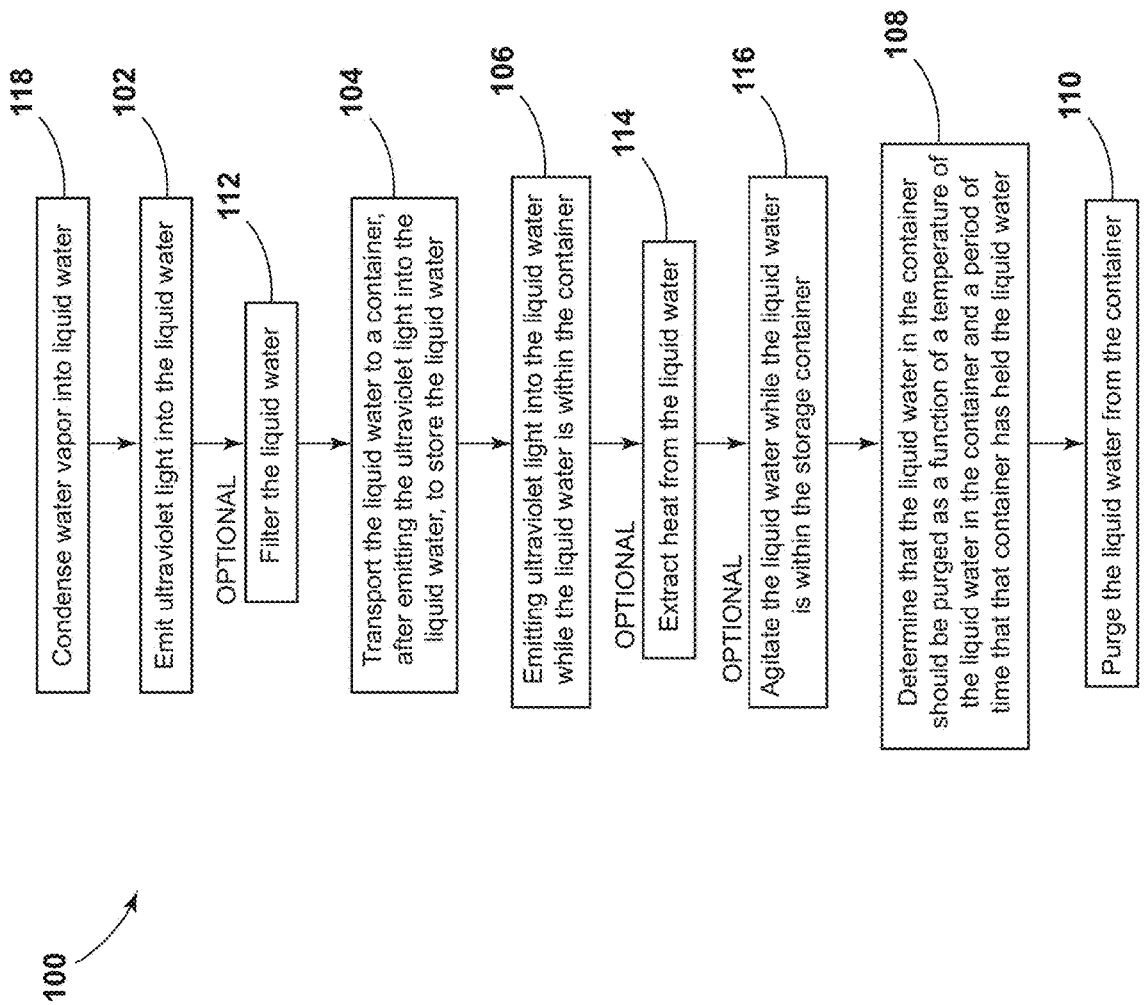
FIG. 4 is a flow diagram of a method of sanitizing the liquid water that the water generation system of FIG. 1 generated, illustrating steps of emitting ultraviolet light into the liquid water, transporting the liquid water to a container (such as the second container of FIG. 2) after the emission of the ultraviolet light, and then again emitting ultraviolet light into the liquid water while the liquid water is within the container.

Referring now to FIG. 4, a method 100 of sanitizing the liquid water 14 that the vehicle 10 has generated is hereinafter described. At a step 102, the method 100 includes emitting the ultraviolet light 52 into the liquid water 14, after the water vapor in the air has been condensed into the liquid water 14. As described, the ultraviolet light 52 destroys the microbes within the liquid water 14 or hinders the ability of the microbes to replicate or reproduce. For example, the ultraviolet light 52 can be emitted into the liquid water 14 while the liquid water 14 is within the first container 28 with the source 50. As another example, the ultraviolet light 52 can be emitted into the liquid water 14 while the liquid water is within the second container 42 with the second source 54. In other embodiments, the ultraviolet light 52 is emitted into the liquid water 14 before or after the liquid water 14 is within the first container 28, such as with an in-line ultraviolet treatment device.

At a step 104, the method 100 further includes transporting the liquid water 14 to the second container 42, after emitting the ultraviolet light 52 into the liquid water 14, to store the liquid water 14. As described, the second container 42 stores the liquid water 14 until the occupant 20 desires the dispenser 82 to dispense the liquid water 14. The pump 36 can cause the liquid water 14 to transport from the first container 28, where the ultraviolet light 52 is emitted into the liquid water 14, to the second container 42.

At a step 106, the method 100 further includes again emitting the ultraviolet light 52 into the liquid water 14 while the liquid water 14 is within the second container 42. The controller 92 can activate the second source 54 to emit the ultraviolet light 52 into the liquid water 14 within second container 42. The second treatment of the liquid water 14 with the ultraviolet light 52 ensures that the liquid water 14 is still sanitized before the liquid water 14 is dispensed to the occupant 20.

In embodiments, the method 100 further includes at a step 108 determining that the liquid water 14 in the second container 42 should be purged as a function of the temperature of the liquid water 14 in the second container 42 and the period of time that the second container 42 has held the liquid water 14. As explained above, the controller 92 receives data from the sensor 48 indicative of the temperature of the liquid water 14. In addition, the controller 92 monitors the period of time that the second container 42 has held the liquid water 14. In embodiments, the controller 92 calculates the staleness score that is a function of both the temperature of the liquid water 14 and the period of time that the second container 42 has held the liquid water 14, and determines to purge the liquid water 14 when the staleness score is greater than the predetermined value.

In embodiments, the method 100 then further includes, at a step 110, purging the liquid water 14 from the second container 42. As described, the controller 92 can cause the purge valve 86 to move to the opened position, allowing the liquid water 14 to drain from the second container 42 to the environment 16 external to the vehicle 10. Purging the liquid water 14 when the controller 92 determines that the liquid water 14 is likely to be sufficiently stale, precludes the potentially stale liquid water 14 from being dispensed to the occupant 20.

In embodiments, the method 100 further includes, at a step 112, filtering the liquid water 14. The filtering of the liquid water 14 occurs before the liquid water 14 is transported to the second container 42 for storage. As described above, the filter 34 can be in fluid flow communication between the first container 28 and the second container 42. The pump 36 can transport the liquid water 14 from the first container 28 to and through the filter 34.

In embodiments, the method 100 further includes, at a step 114, extracting heat from the liquid water 14, after transporting the liquid water 14 to the second container 42. As described above, the cooling element 72 removes heat from the liquid water 14, which lowers the temperature of the liquid water 14 held within the second container 42. The second pump 66 can transport the liquid water 14 from the second container 42, through the cooling element 72, and back to the second container 42. Lowering the temperature of the liquid water 14 being stored in the second container 42 extends the period of time that the second container 42 holds the liquid water 14 before the liquid water 14 is determined to become stale and, therefore, purged.

In embodiments, the method 100 further includes, at a step 116, agitating the liquid water 14 while the liquid water 14 is within the second container 42. As discussed, the controller 92 can cause the agitator 56 to agitate the liquid water 14 simultaneously with causing the second source 54 of the ultraviolet light 52 to emit the ultraviolet light 52. Agitating the liquid water 14 can improve the efficiency of the sanitization efforts via the ultraviolet light 52 and decrease the amount of time required to sanitize the liquid water 14 through the emission of the ultraviolet light 52.

In embodiments, the method 100 further includes, at a step 118, condensing the water vapor into the liquid water 14. As discussed, the evaporator 22 causes the water vapor in the air passing over the evaporator 22 to condense into the liquid water 14. In other embodiments, some other form of condenser that causes condensation of the liquid water 14 from the water vapor in the air can be utilized.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A water generation system for a vehicle comprising:
   a first container to collect liquid water generated from condensation of water vapor;
   a filter to filter the liquid water, the filter in fluid flow communication with the first container;
   a second container to store the liquid water that the filter filtered, the second container (i) in fluid flow communication with the filter and (ii) configured to hold a larger volume of the liquid water than the first container;
   a cooling element in fluid communication with the second container, the cooling element configured to withdraw heat from the liquid water within the second container;
   a pump that, when activated, transports the liquid water via tubing (i) from the second container, (ii) through the cooling element, and (iii) back to the second container; and
   a source of ultraviolet light that, when activated, emits the ultraviolet light into at least one of the first container and the second container.

2. The water generation system of claim 1 further comprising:
   an agitator that is configured to agitate the liquid water disposed within either the first container or the second container.

3. The water generation system of claim 2, wherein the agitator comprises a magnetizable element within either the first container or the second container that rotates in response to a rotating magnetic field generated outside of the first container or the second container.

4. The water generation system of claim 1 further comprising:
   a controller in communication with the pump, the controller configured to activate the pump until a temperature of the liquid water in the second container has decreased to a predetermined temperature.

5. The water generation system of claim 1 further comprising:
   a controller in communication with the source of the ultraviolet light, the controller configured to cause the source to emit the ultraviolet light for a predetermined period of time and at reoccurring intervals.

6. The water generation system of claim 1 further comprising:
   a battery providing electrical power to the source of the ultraviolet light, including when the vehicle is deactivated.

7. The water generation system of claim 1 further comprising:
   a purge valve in fluid flow communication with the second container; and
   a controller in communication with the purge valve, the controller configured to manipulate the purge valve as a function of at least one of: (i) a temperature of the liquid water within the second container, and (ii) a period of time that the second container has held the liquid water.

8. The water generation system of claim 1 further comprising:
   an evaporator that condenses the water vapor into the liquid water.

9. The water generation system of claim 1, wherein the source of the ultraviolet light that, when activated, emits the ultraviolet light onto both the liquid water within the second container and an inner surface of the second container that contacts the liquid water.

10. The water generation system of claim 1, wherein the source of the ultraviolet light, when activated, emits the ultraviolet light onto both the liquid water within the first container and an inner surface of the first container that contacts the liquid water.

11. The water generation system of claim 10 further comprising:
    a second source of ultraviolet light, when activated, emits the ultraviolet light onto both the liquid water within the second container and an inner surface of the second container that contacts the liquid water.

12. A vehicle comprising:
    an evaporator configured to condense water vapor into liquid water;
    a first container configured to collect the liquid water that condensed;
    a source of ultraviolet light that, when activated, emits the ultraviolet light into the liquid water within the first container and onto an inner surface of the first container that contacts the liquid water;
    a filter to filter the liquid water, the filter in fluid flow communication with the first container;
    a second container to store the liquid water that the filter filtered in fluid flow communication with the filter, the second container configured to hold a larger volume of the liquid water than the first container;
    a second source of ultraviolet light that, when activated, emits the ultraviolet light onto the liquid water with the second container and onto an inner surface of the second container that contacts the liquid water;

an agitator configured to agitate the water in the second container;

a controller in communication with the agitator and the second source of the ultraviolet light, the controller configured to activate the agitator and the second source of the ultraviolet light at preset intervals;

a cooling element in fluid communication with the second container, the cooling element configured to withdraw heat from the liquid water within the second container; and a pump that, when activated, transports the liquid water via tubing (i) from the second container, (ii) through the cooling element, and (iii) back to the second container.

13. The vehicle of claim 12, wherein
the controller is configured to activate simultaneously the agitator and the second source of the ultraviolet light at the preset intervals.

14. A water generation system for a vehicle comprising:
a first container to collect liquid water generated from condensation of water vapor;
a filter to filter the liquid water, the filter in fluid flow communication with the first container;
a second container to store the liquid water that the filter filtered, the second container (i) in fluid flow communication with the filter and (ii) configured to hold a larger volume of the liquid water than the first container;
a source of ultraviolet light that, when activated, emits the ultraviolet light into at least one of the first container and the second container;
a purge valve in fluid flow communication with the second container, the purge valve comprising an open state wherein the liquid water within the second container drains to an environment external; and
a controller in communication with the purge valve, the controller configured to manipulate the purge valve to the open state as a function of a temperature of the liquid water within the second container being greater than a predetermined temperature.

15. The water generation system of claim 14, wherein
the controller is further configured to manipulate the valve to the open state as a function of a period of time that the second container has held the liquid water.

16. The water generation system of claim 14 further comprising:
an agitator that is configured to agitate the liquid water disposed within the second container.

17. The water generation system of claim 14 further comprising:
a cooling element in fluid communication with the second container, the cooling element configured to withdraw heat from the liquid water within the second container.

18. The water generation system of claim 17 further comprising:
a pump that, when activated, transports the liquid water via tubing (i) from the second container, (ii) through the cooling element, and (iii) back to the second container; and
a controller in communication with the pump, the controller configured to activate the pump until the temperature of the liquid water in the second container has decreased to the predetermined temperature.

19. The water generation system of claim 14 further comprising:
an evaporator that condenses the water vapor into the liquid water.

20. The water generation system of claim 14, wherein
the source of the ultraviolet light, when activated, emits the ultraviolet light onto both the liquid water within the second container and an inner surface of the second container that contacts the liquid water.

* * * * *